United States Patent
Le Roy-Delage et al.

(10) Patent No.: US 8,551,244 B2
(45) Date of Patent: Oct. 8, 2013

(54) SELF ADAPTIVE CEMENT SYSTEMS

(75) Inventors: Sylvaine Le Roy-Delage, Paris (FR); Dominique Guillot, Fontenay aux Roses (FR); Keith Dismuke, Katy, TX (US); Erik Nelson, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/907,958

(22) Filed: Oct. 19, 2010

(65) Prior Publication Data

US 2011/0120715 A1 May 26, 2011

Related U.S. Application Data

(63) Continuation of application No. 10/556,990, filed as application No. PCT/EP2004/005478 on May 14, 2004, now abandoned.

(60) Provisional application No. 60/470,341, filed on May 14, 2003.

(51) Int. Cl.
*E21B 33/13* (2006.01)

(52) U.S. Cl.
USPC .............................. 106/724; 166/292; 166/293

(58) Field of Classification Search
USPC .................................. 106/724; 166/292, 293
See application file for complete search history.

(56) References Cited

U.S. PATENT DOCUMENTS

| | | | |
|---|---|---|---|
| 3,487,038 A | 12/1969 | Toy et al. | |
| 3,487,938 A | 1/1970 | Patterson | |
| 3,558,335 A * | 1/1971 | Messenger | 106/717 |
| 4,182,677 A | 1/1980 | Bocard et al. | |
| 4,664,816 A | 5/1987 | Walker | |
| 5,302,200 A | 4/1994 | Smetana et al. | |
| 5,391,226 A * | 2/1995 | Frankowski | 106/696 |
| 5,393,343 A | 2/1995 | Darwin et al. | |
| 5,443,636 A | 8/1995 | Montgomery | |

(Continued)

FOREIGN PATENT DOCUMENTS

| | | |
|---|---|---|
| CN | 1320754 | 7/2001 |
| CN | 1398945 | 2/2003 |

(Continued)

OTHER PUBLICATIONS

Database WPI Section Ch, Week 200204 Derwent Publications Ltd, London, GB, AN 2002-028940 XP002295616 & JP 2001 146457 A (Denki Kagaku Kogyo KK) May 29, 2001 abstract.

(Continued)

*Primary Examiner* — Paul Marcantoni
(74) *Attorney, Agent, or Firm* — Michael Dae (57) ABSTRACT

A self-adaptive cement system includes cement, water and at least one additive that reacts or/and expands in contact with oil and gas. Several chemical products have been identified including rubber alkylstyrene, polynorbornene, resins such precrosslinked substituted vinyl acrylate copolymers and diatomaceous earth. These additives have the effect of making the cement self-healing in the event of physical failure or damage such as micro-annuli. The self healing property is produced by the contact with subterranean hydrocarbon fluids, the potential repair mechanism is thus activated if and when needed in case of start of loss of zonal isolation. In another embodiment, the expansion is deliberately induced by pumping a hydrocarbon fluid in the vicinity of the set cement.

6 Claims, 4 Drawing Sheets

(56) References Cited

U.S. PATENT DOCUMENTS

| | | | |
|---|---|---|---|
| 5,456,751 A * | 10/1995 | Zandi et al. | 106/724 |
| 5,575,841 A | 11/1996 | Dry | |
| 5,587,012 A | 12/1996 | Montgomery | |
| 5,660,624 A | 8/1997 | Dry | |
| 5,665,158 A | 9/1997 | Darwin et al. | |
| 5,683,503 A | 11/1997 | Montgomery | |
| 5,779,787 A * | 7/1998 | Brothers et al. | 106/802 |
| 5,989,334 A | 11/1999 | Dry | |
| 5,997,633 A | 12/1999 | Montgomery | |
| 6,261,360 B1 | 7/2001 | Dry | |
| 6,296,057 B2 | 10/2001 | Thiercelin | |
| 6,458,198 B1 | 10/2002 | Baret et al. | |
| 6,527,849 B2 | 3/2003 | Dry | |
| 6,645,288 B1 * | 11/2003 | Dargaud et al. | 106/696 |
| 6,656,263 B2 | 12/2003 | Audibert et al. | |
| 6,742,592 B1 * | 6/2004 | Le Roy-Delage et al. | 166/293 |
| 6,843,841 B2 | 1/2005 | Reddy et al. | |
| 6,902,001 B2 * | 6/2005 | Dargaud et al. | 166/293 |
| 7,607,482 B2 * | 10/2009 | Roddy et al. | 166/292 |
| 7,927,419 B2 * | 4/2011 | Roddy et al. | 106/716 |
| 2003/0181543 A1 | 9/2003 | Reddy et al. | |
| 2004/0007360 A1 * | 1/2004 | Leroy-Delage et al. | 166/293 |
| 2004/0163812 A1 * | 8/2004 | Brothers | 166/293 |
| 2004/0168802 A1 | 9/2004 | Creel et al. | |
| 2004/0211562 A1 * | 10/2004 | Brothers et al. | 166/281 |
| 2004/0211564 A1 * | 10/2004 | Brothers et al. | 166/293 |
| 2004/0221990 A1 | 11/2004 | Heathman et al. | |
| 2004/0251026 A1 * | 12/2004 | Dargaud et al. | 166/292 |
| 2005/0120920 A1 * | 6/2005 | Brothers | 106/814 |
| 2005/0222302 A1 | 10/2005 | Pageau | |

FOREIGN PATENT DOCUMENTS

| | | |
|---|---|---|
| EP | 0530768 | 2/1996 |
| EP | 1129047 | 11/2002 |
| GB | 2271350 | 9/1992 |
| WO | 00/20350 | 4/2000 |
| WO | 00/37387 | 6/2000 |
| WO | 01/70646 | 9/2001 |
| WO | 01/74967 | 10/2001 |
| WO | 03/068708 | 8/2003 |

OTHER PUBLICATIONS

Database WPI Section Ch, Week 199209 Derwent Publications Ltd, London, GB, AN 1992-072444 XP002296443 & ZA 9 100 876 A (Snashall H T) Dec. 24, 1991 abstract.

"Three designs for the internal release of sealants, adhesives, and waterproofing chemicals into concrete to reduce permeability," C.M. Dry, Cement and Concrete Research 30 (2000) 1969-1977.

* cited by examiner

SELF ADAPTIVE CEMENT SYSTEMS

CROSS-REFERENCED APPLICATIONS

This application is a Continuation Application of U.S. patent application Ser. No. 10/556,990 that entered the U.S. on Jan. 22, 2007, now abandoned, from international application PCT/EP2004/005478 filed on May 14, 2004 claiming the benefit of the disclosure of U.S. provisional application No. 60/470,341 filed on May 14, 2003.

TECHNICAL FIELD OF THE INVENTION

The present invention relates to adaptive cement systems. In particular, the invention relates to cement systems which are "self-healing", i.e. system which can adapt to compensate for changes or faults in the physical structure of the cement, or which adapt their structure after the setting phase of the cement in the cementing of oil, gas, water or geothermal wells, or the like.

BACKGROUND OF THE INVENTION

During the construction of underground wells, it is common, during and after drilling, to place a liner or casing, secured by cement pumped into the annulus around the outside of the liner. The cement serves to support the liner and to provide isolation of the various fluid-producing zones through which the well passes. This later function is important since it prevents fluids from different layers contaminating each other. For example, the cement prevents formation fluids from entering the water table and polluting drinking water, or prevents water from passing into the well instead of oil or gas. In order to fulfill this function, it is necessary that the cement be present as an impermeable continuous sheath. However, for various reasons, over time this sheath can deteriorate and become permeable. The deterioration can be due to physical stresses caused by tectonic movements of temperature effects, chemical degradation of the cement, or various other reasons.

There have been a number of proposals to deal with the problems of deterioration of the cement sheath over time. One approach is to design the cement sheath to take into account physical stresses that might be encountered during its lifetime. Such an approach is described in U.S. Pat. No. 6,296,057. Another approach is to include in the cement composition materials that improve the physical properties of the set cement. U.S. Pat. No. 6,458,198 describes the addition of amorphous metal fibers to the cement slurry to improve its strength and resistance to impact damage. EP 1129047 and WO 00/37387 describe the addition of flexible materials (rubber or polymers) to the cement to confer a degree of flexibility on the cement sheath. WO 01/70646 and PCT/EP03/01578 describe cement compositions that are formulated so as to be less sensitive to the effects of temperature on the cement when setting.

A number of proposals have been made for designs of self-healing concretes for use in the construction industry. These are described in U.S. Pat. No. 5,575,841, U.S. Pat. No. 5,660,624, U.S. Pat. No. 5,989,334, U.S. Pat. No. 6,261,360 and U.S. Pat. No. 6,527,849, and in "Three designs for the internal release of sealants, adhesives, and waterproofing chemicals into concrete to reduce permeability", Dry, C. M., Cement and Concrete Research 30 (2000) 1969-1977. None of these are immediately applicable to well cementing operations because of the need for the cement to be pumpable during placement and because of the pressure and temperature range.

It is an objective of the present invention to provide well cementing systems that can be placed by pumping in the normal manner, and which contain materials that allow the cement sheath to adapt its structure in response to environmental conditions.

SUMMARY OF THE INVENTION

In a first aspect, the invention concerns thus a well cementing composition comprising a pumpable slurry of cement, water and a material that reacts and/or expands (swells) in contact with liquid or gaseous hydrocarbon. This behavior has the effect of making the cement self-healing in the event of physical failure or damage.

Numerous materials can be added as additive to the cement matrix and available to react/expand upon contact with hydrocarbons. Examples of such materials include rubber, in particular styrene butadiene rubber and ground rubber, poly 221 bicyclo heptene (polynorbornene), alkylstyrene, crosslinked substituted vinyl acrylate copolymers and diatomaceous earth. Mixture of two or more of these materials can also be used, in particular to provide a cement that is susceptible to react to a large variety of subterranean hydrocarbon liquids.

The material can be of almost any shape and size: spherical, fiber-like, ovoid, mesh systems, ribbons, etc., which allows their easy incorporation in cement slurries of comprising solid materials in discrete particle size bands. From a mixing and pumping point of view, it is usually better to use granular particles having a dimension less than 850 μm.

As mentioned above, after setting, the cement composition of the present invention will expand upon contact with a liquid or gaseous hydrocarbon. In that aspect, this provides a method of cementing a well with a self-healing cement, in particular with a cement that will fill the micro-cracks or fractures in the cement matrix when underground hydrocarbon enters the fault in the cement matrix and thus prevents the onset of the permeability. Moreover the properties of expansion of the set cement in contact with oil or more generally with hydrocarbon can also repair the micro-annuli at the interface between the cement and the casing or formation, a property that is particularly interesting to prevent gas migration.

In another aspect of the present invention, the cement composition further comprises an additive having residual water-absorption properties after the setting of the cement, thereby susceptible to swell in contact with underground water. This provides cement that is able to self-heal whatever fluid it comes in contact with in the underground formation. This type of additive are more specifically described in the International Patent Application also entitled "self-adaptive cement", claiming the same priority as the present invention and naming Sylvaine Leroy-Delage, Muriel Martin-Beurel, Keith Dismuke and Erik Nelson as inventors, and which is hereby incorporated by reference. Suitable additive includes in particular super-absorbent polymer preferably selected from the list consisting of polymethacrylate and polyacrylamide or a non-soluble acrylic polymers. The super-absorbent polymer is preferably added dry-blended with the cement, at concentrations ranging from 0.05% to 3.2% by weight of cement The cement slurry according to any of claims 17 to 20, wherein the super-absorbent polymer is added under the form of particles ranging form 10μ to 150μ.

In another aspect of the invention, the hydrocarbon fluid is considered as a triggering event that will cause the final expansion of the cement during a cementing process. In that case, the composition of the present invention may be pumped in a given zone, allowed to set and the hydrocarbon fluid is pumped in the immediate vicinity of the set cement to promote its expansion and the complete filling of the area to be cemented. Of course, this method is particularly suitable for hard to cement zones, in particular zones that are too narrow for conventional cement to properly penetrate such as micro-fractures or other repair jobs.

DETAILED DESCRIPTION

Different solid materials have the property to react with hydrocarbons in particular with subterranean hydrocarbons.

One example of a polymer suitable for such use is alkyl-styrene which is available in bead form from Imtech Imbibitive Technologies Corp. under the name: Imbiber Beads. These are cross-linked alkylstyrene polymers engineered to absorb a broad range of organic chemicals (hence hydrocarbons). The beads are solid, spherical beads of approx. 200-300 microns diameter. They are unaffected by water but when placed in contact with liquid organic materials will absorb up to 27 times the volume of organic liquid and expand up to three times the original diameter, depending on the liquid and other environmental variable such as temperature, pressure, etc. The organic liquid is held in the organic structure and is not released under pressure.

Other examples of polymer capable of absorbing hydrocarbons are polymers used for hydrocarbons spills are for instance poly 221 bicyclo heptene (polynorbornene, e.g. Norsorex® AP X1 from ATOFINA) or INIPOL® AB40 from CECA.

Several grades from Norsorex are available (Norsorex NS or Norsorex AP X1 for instance). The behavior in oil may vary from simple gelling effect without expansion to gelling and expansion. Norsorex® is a white polymer powder, it is hydrophobic and oleophilic and has a low density (0.96 g/cm$^3$). It is insoluble and inert in water. It has been developed by ATOFINA to absorb high quantities of various hydrocarbons including for instance naphtenic oil, kerosene aromatic oil.

Other example is ground rubber. The ground rubber particles are obtained by recycling tires. The recycling process is a series of shredding and special grinding operations to remove metal and fiber. These particles contain a certain amount of carbon black. Two sources have been tested: ground rubber from ATR (American Tyre Recycler) and ECORR RNM 45 from Rubber Ressources. Density of such products is between 1.1-1.2 g/cm$^3$. It has been patented that the use of ground rubber particles in cement formulations improved the cement mechanical properties by decreasing the value of the Young's modulus and by improving the behavior under shock. These ground rubber particles also have self healing effect and lead to expansion properties in contact with hydrocarbon.

It is possible to mix different flexible particles such as polypropylene, polyethylene or acrylonitrile butadiene to have flexibility and self-healing effect. The ratio of mixture for such particles allows adjusting flexibility and self-healing effect. The concentration is an important factor.

Other possibility is to use resins such as precrosslinked substituted vinyl acrylate copolymers in dry powder form. For instance the Pliolite family developed by Eliokem. These resins are available in different range with different behavior in terms of swelling effect in organic fluids. They produce soft colloidal microgels in organic fluids. They should be slowly added to the fluid under shear to ensure complete gel development. They are already used in oilfield in organic based drilling fluids as primary fluid loss control additives with secondary rheological contribution. They are suitable for HTHP wells since they are heat stable up to 500° F. They are insoluble in water and are able to swell in various aromatics and aliphatic fluids.

However all polymers or elastomers having the properties to swell in contact with hydrocarbon are not adequate for oil well conditions. A counter example is for instance EPDM (elastomeric terpolymer from ethylene, propylene and a non-conjugated diene). Nordel® products from Dupont Dow Elastomer are given as mid-performance in ASTM D2000: it means that at a service temperature equal to 120° C. the volume swell in ASTM n0 3 oil is around 120%. Amongst the several grades available, Nordel MG (NDR 47085.01) has been selected for its finer particle size (although granular form thus coarse particle for our specifications application in cement slurry) and its mixture with carbon black. The presence of carbon black and the granular form facilitate the oil absorption.

Materials such as diatomaceous earth or perlite can also be used in an absorbent, swelling role. Diatomite it is a soft bulky solid material (88% silica) composed of skeletons of small prehistoric aquatic plants related to algae. They are available in powder, its specific gravity is between 1.9 and 2.35. This powder is able to absorb 1.5 to 4 times its weight of water and also has high oil absorption capacity it is used as absorbent in industry. The particle size is an important factor because this material is able to swell in water and also in oil.

The absorbent materials are typically dry blended with the cement and any other solid components before transport to the well-site, mixing with water and placement in the well. The sizes and quantities will be selected to allow even dispersion through the cement matrix. A range of materials and/or particle sizes can be used to permit extended behavior over a period of time. However for some material it could be necessary to prehydrate the material in mix water before adding the cement.

Other and further objects, features and advantages of the present invention will be readily apparent to those skilled in the art upon a reading of the description of the examples which follows, taken in conjunction with the accompanying drawings.

TESTING PROCEDURE

Tests have been carrying out by incorporating powders of various types of polymers as solid additives in cement slurries. The cement slurries are then placed in annular expansion cell to study the expansion behavior when the cement set and also the behavior after setting when it is in contact with hydrocarbon. To compare the product behavior in oil, the same blend is used; the comparison between tests is made by changing the polymer nature. Several polymer concentrations have been tested, ranging from 10% to 50% BVOB (by volume of blend). All designs are based on fresh water and black Dyckerhoff North cement. Most slurries include fine crystalline silica (noted fine silica).

The slurries were optimized with the mere objective of obtaining stability. Focus was to get acceptable plastic viscosity (PV) and yield stress (TY) at mixing time and after 20 minutes of conditioning. Free water and sedimentation tests were also carried out. Mixing and test procedure was according to API Spec 10.

The same equipment and bob was used for all rheology measurements, whatever the tested design. With large particles, the results are therefore only indicative of a trend. Indeed, no measurement was made with particles greater than 1 mm.

The linear expansion of the cement slurries is measured with a device consisting of a bottom plate, a split expandable ring with two attached pins and a top plate. The expandable ring is placed between the two plates, and a screw fixes the two plates together. When the cement sets and expands, the outside diameter of the expandable ring grows and the distance between the attached pins increases. The linear expansion of the slurry is calculated from the difference of the readings by multiplying this value times a constant corresponding to the circumference of the mold.

The curing process includes two steps: first, the slurry is put in water bath during at least 7 days at the selected temperature to follow the linear expansion versus the time, this step can be prolonged if necessary to reach a flat level of expansion; then the set sample is then transferred in oil to record expansion versus time. This two-step curing procedure simulates setting of the cement matrix in the well followed by contact with oil due to loss of zonal isolation (either cracks or creation of a micro-annuli).

Tests were performed with three different oils: an oil consisting from 60 to 100% of aliphatic hydrocarbons (not O1), with a flash point of 113° C.; diesel (O2)—tested only at room temperature due to a flash point below 60° C.; and a dearomatized hydrocarbon fluid having a flash point of 103° C. (O3). Samples were cured in molds at 60° C. in a water bath under atmospheric pressure for one week. Cylinders (1-inch diameter, 2-inch long) were then cored and the cores placed in oil.

EXAMPLE 1

Ground Rubber

Two sources of ground rubber particles obtained by recycling tires were tested. GR1 particles are commercialized by American Tyre Recycler under the name "Rubber 40 mesh" have a density of 1.2 g/cm³ and an average particle size of 425μ. GR2 are commercialized by Rubber Ressources, under the product name ECORR RNM 45. The density is 1.2 g/cm³, the average particle size 355μ. Both are ground rubber obtained by a recycling process involving a series of shredding and special grinding operations to remove metal and fiber. These particles are black and contain a certain amount of carbon black. Recycled rubber has the advantage of being flexible and cheap. The slurry designs and rheological properties are in table 1 below in which the concentration of solid are given either by reference to the original cement blend (BVOB) or by weight of blend and the concentrations of liquid additives are given in US gallons per sack of 94 lbs of blend (in other words, 1 gpsb=88.78 cc/kg)

TABLE 1

| Formulations: | A1 | A5 | A6 | A12 |
|---|---|---|---|---|
| Particle | GR1 | GR1 | GR2 | GR2 |
| Density ppg | 16.1 | 16.8 | 16.1 | 16.8 |
| Porosity % | 42 | 42 | 42 | 42 |

TABLE 1-continued

| Formulations: | A1 | A5 | A6 | A12 |
|---|---|---|---|---|
| Cement (% BVOB) | 40 | 40 | 40 | 40 |
| Fine silica (% BVOB) | 10 | 10 | 10 | 10 |
| Ground rubber (% BVOB) | 20 | 10 | 20 | 10 |
| Silica sand (% BVOB) | 30 | 40 | 30 | 40 |
| Polypropylene glycol (antifoam) (gpsb) | 0.03 | 0.03 | 0.03 | 0.03 |
| Polynaphtalene sulfonate (dispersant) (gpsb) | 0.01 | 0.01 | 0.01 | 0.01 |
| Lignosulfonate (gpsb) | 0.045 | 0.045 | 0.045 | 0.045 |
| Rheology After mixing | | | | |
| PV (cP) | 134 | 120 | 134 | 132 |
| Ty (lbf/100 ft²) | 2 | 3.5 | 2 | 4 |
| Rheology After Conditioning At 60° C. | | | | |
| PV (cP) | 132 | 98 | 132 | 119 |
| Ty (lbf/100 ft²) | 13 | 12 | 13 | 8 |
| API free water (mL) | 2 | 2 | 1 | 1 |
| Sedimentation (delta bottom/top in ppg) | 0.31 | 0.66 | 0.27 | 0.39 |

Linear expansion values are reported Table 2 below. In all case ground rubber shows a rapid increase of expansion immediately after being contacted with oil.

TABLE 2

| | Linear expansion (%) | | | |
|---|---|---|---|---|
| | At room temperature | | At 60° C. | |
| | O2 | O3 | O1 | O3 |
| A1 | 0.25 | 0.26 | 0.7 | 1.5 |
| A5 | | | 0.12 | |
| A6 | | 0.14 | 0.36 | 2.5-5 |
| A12 | | | 0.12 | |

Figure 1:
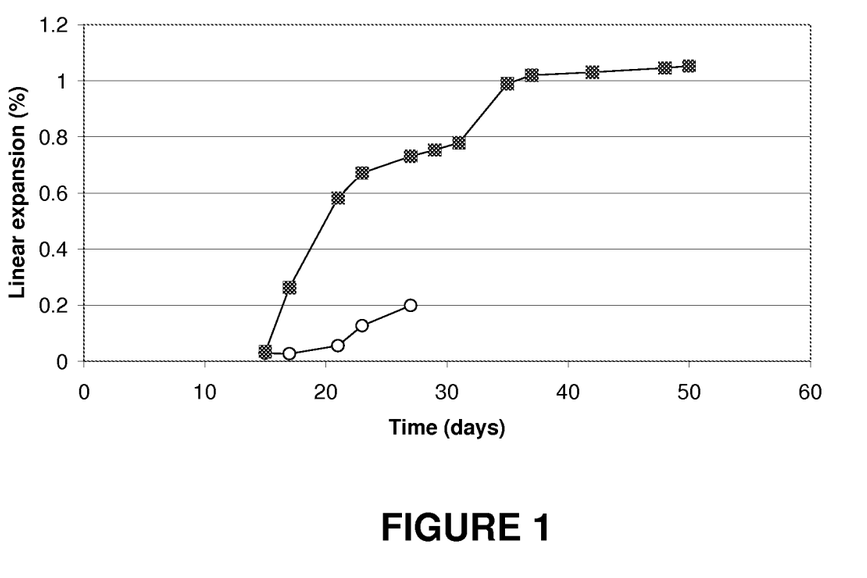
FIGS. 1 to 8 are plots of the development of the linear expansion (in %) with time (in days) for different systems according to the present invention

FIG. 1 is a plot of the linear expansion along time (in days) for slurry A2, when exposed to the dearomatized oil. Note that virtually no expansion was observed on reference cores put in water. The open circles correspond to the tests performed at room temperature while the full squares are for the test at 60° C. Expansion is observed with oil and the expansion level increases with temperature (0.26% at room temperature and up to 0.9% at 60° C. It should be observed that for clarity purpose, the value of only one test have been reported in this FIG. 1—and in all other similar figures—while the result data given in table 2—or in corresponding similar tables—are average based on several tests and consequently, do not necessarily match in values.

Figure 2:
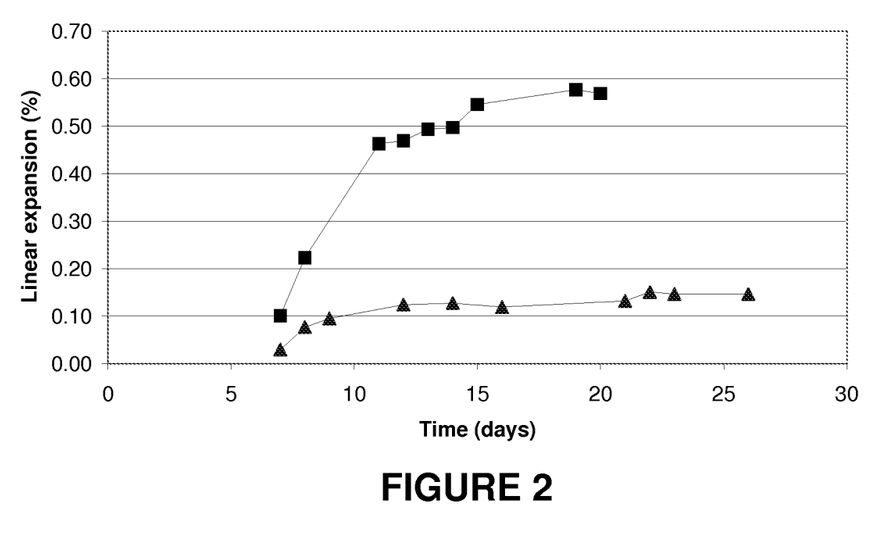

Increasing the concentration of rubber particles affects the expansion level. For example, FIG. 2 shows the linear expansion vs. time for slurry A1 (full squares) and A2 (full triangles) upon exposition to the aliphatic hydrocarbon oil O1, at 60° C. The expansion reaches 0.7% at 20% BVOB instead of 0.1% at 10% BVOB.

Figure 3:
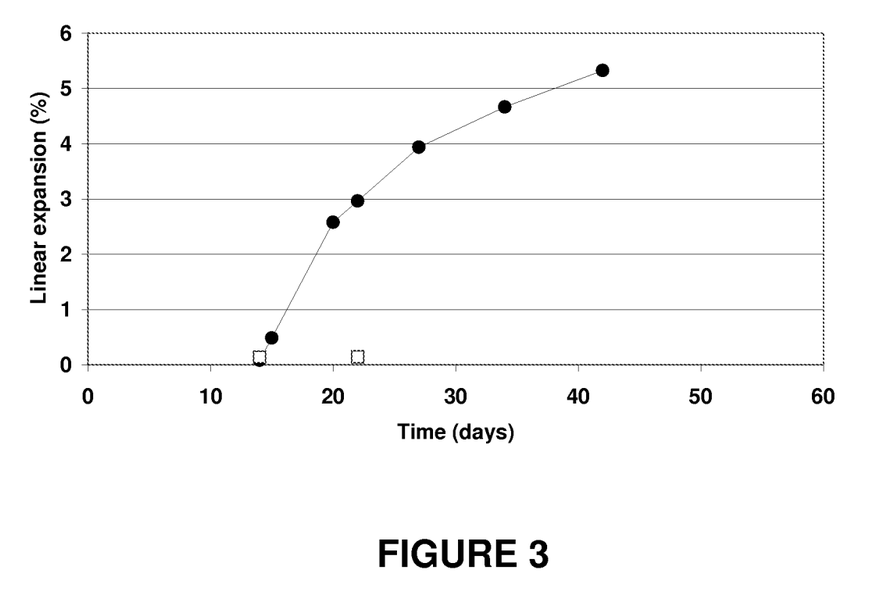

With the second source of ground rubber, higher levels of expansion have been observed. Indeed, as shown FIG. 3 where the linear expansion vs. time is plotted for samples A6, put in oil O3, expansion levels are almost doubled compared to previous tests. FIG. 3 also confirms the temperature effect (open square plots for room temperature tests, full circles for tests at 60° C.).

EXAMPLE 2

Flexible Particles

TABLE 3

Different types of flexible particles whose characteristics are provided table 3 were studied.

| Code | Chemical nature | Product name | Supplier | Density g/cm$^3$ | Size (micron) |
|---|---|---|---|---|---|
| F1 | Polypropylene | Icorene 9013 P | ICO polymer | 0.9 | 200-800 |
| F2 | Acrylonitrile butadiene copolymer | Chemigum P86F | Eliokem | 1.0 | 350 |

Different slurries were prepared as for example 1, whose designs and rheological properties are shown table 4 below.

TABLE 4

| Formulations: | A9 | A36 | A22 |
|---|---|---|---|
| Particle | F1 | F1 | F2 |
| Density ppg | 15.8 | 13.5 | 15.9 |
| Porosity % | 42 | 42 | 42 |
| Cement (% BVOB) | 40 | 40 | 40 |
| Fine silica (% BVOB) | 10 | 10 | 10 |
| Flexible particles (% BVOB) | 20 | 20 | 20 |
| Ground rubber GR1 (% BVOB) | | 30 | |
| Silica sand (% BVOB) | 30 | | 30 |
| Polypropylene glycol (antifoam) (gpsb) | 0.03 | 0.03 | 0.03 |
| Polynaphtalene sulfonate (dispersant) (gpsb) | 0.010 | 0.03 | 0.01 |
| Lignosulfonate (gpsb) | 0.045 | 0.045 | 0.045 |
| Rheology After mixing | | | |
| PV (cP) | 92 | 102 | 136 |
| Ty (lbf/100 ft$^2$) | 0.4 | 14 | 9 |
| Rheology After Conditioning At 60° C. | | | |
| PV (cP) | 83 | 104 | 99 |
| Ty (lbf/100 ft$^2$) | 6 | 7 | 11 |
| API free water (mL) | | 1.3 | 2 |
| Sedimentation (delta bottom/top in ppg) | | 0.05 | |

Linear expansion values are reported Table 5 below. In all case ground rubber shows a rapid increase of expansion immediately after being contacted with oil at 60° C.

TABLE 5

| | Linear expansion at 60° C. (%) | |
|---|---|---|
| | O1 | O3 |
| A9 | 0.1 | |
| A36 | | 2.5 |
| A22 | <0.1 | |

Figure 4:
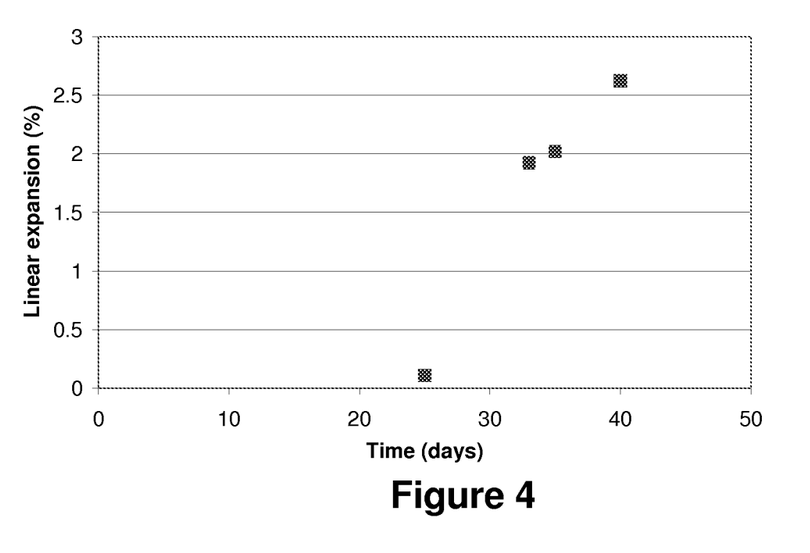

Neither acrylonitrile butadiene rubber (F2) nor polypropylene (F1) has developed expansion even under temperature in oil. However the F1/GR1 blend mixture of test A36 develops expansion in contact with oil. For instance in oil O3 at 60° C. the expansion is not flat after 40 days and get up to 2.5% as illustrated FIG. 4.

EXAMPLE 3

Alkylstyrene Particles

Imbiber Beads® (a registered names of Imbibitive Technologies Corporation) are cross-linked alkylstyrene polymers engineered to absorb a broad range of organic chemicals. The beads are solid, spherical particles that are approximatively 200-300 microns in diameter. Typical application of such beads is too prevent spills from escaping into the environment. They are unaffected by water, and once contact has been made with a adequate liquid organic the beads will absorb up to 27 volumes of the organic liquid and swell up to 3 diameters depending on the liquid and on other variables such as temperature. The liquid is held in the molecular structure, the imbiber bead will not release the liquid due to compression. Its density is 1.12 g/cm$^3$.

Beads B1 are made exclusively of alkylstyrene. Beads B2 are a mixture at a 50:50 weight ratio of alkylstyrene beads and sand. The compositions of the tested slurries are shown in table 6. Note that for slurries A17 and A29, the concentration of beads is given by weight of cement and not by weight of blend as for slurries A30 and A31.

TABLE 6

| Formulations: | A30 | A31 | A17 | A29 |
|---|---|---|---|---|
| Particle | B2 | B2 | B1 | B2 |
| Density ppg | 16.85 | 15.8 | 15.8 | 15.8 |
| Porosity % | 42 | 42 | 49.4 | 48.3 |
| Cement (% BVOB) | 40 | 40 | | |
| Fine silica (% BVOB) | 10 | 10 | | |
| Beads (% BVOB) | 20 | 50 | (10) | (10) |
| Silica sand (% BVOB) | 30 | | | |
| Polypropylene glycol (antifoam) (gpsb) | 0.03 | 0.03 | 0.03 | 0.03 |
| Polynaphtalene sulfonate (dispersant) (gpsb) | 0.04 | 0.04 | 0.06 | 0.04 |
| Lignosulfonate (gpsb) | | | | |
| Rheology After mixing | | | | |
| PV (cP) | | | | 98 |
| Ty (lbf/100 ft$^2$) | | | | 27 |
| Rheology After Conditioning At 60° C. | | | | |
| PV (cP) | | | | |
| Ty (lbf/100 ft$^2$) | | | | |
| API free water (mL) | 0 | | | 1.5 |
| Sedimentation (delta bottom/top in ppg) | 0.25 | | | 0.23 |

Figure 5:
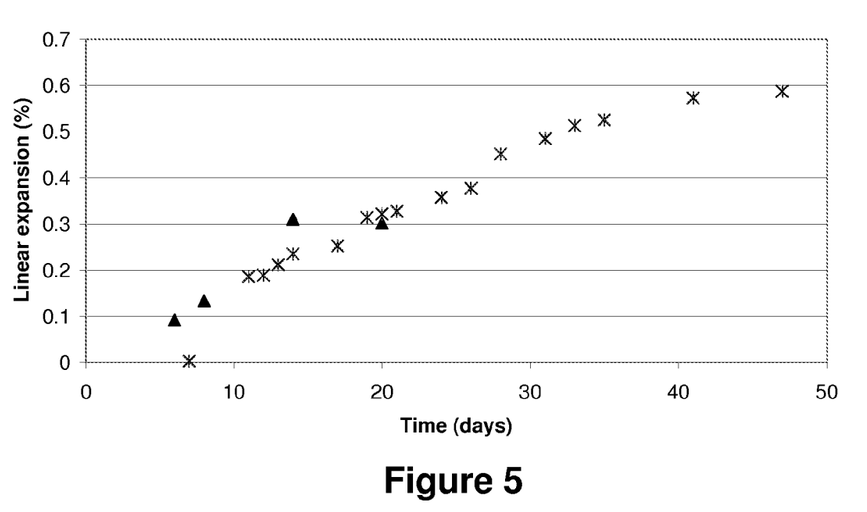

The expansion starts immediately upon contact with oil. Results are provided table 7. Acceptable expansion levels are achieved at 60° C. as shown FIG. 5 for samples A31 where the stars correspond to samples put in contact with oil O1 and the triangles to a contact with oil O3.

TABLE 7

| | Linear expansion (%) | | | | |
|---|---|---|---|---|---|
| | At room temperature | | | At 60° C. | |
| | O1 | O2 | O3 | O1 | O3 |
| A30 | 0.1 | 0.1 | | 0.14 | 0.17 |
| A31 | 0.15 | 0.15 | <0.1 | 0.5 | 0.22 |
| A17 | 0.35 | | | 0.7-3 | |

EXAMPLE 4

Polynorbornene

Fluorinated resins like poly 221 bicyclo heptene (polynorbornene) are used for hydrocarbon spills are commercial products include for instance Norsorex® AP XI available from ATOFINA, Paris, France and INIPOL AB 40 available from CECA, Paris, France. Depending on the specific grade, the behavior in oil varies form simple gelling to gelling with expansion. Norsorex AP XI is a white polymer powder, made from particles ranging from about 0.5 mm to about 1 mm, having a density of 0.96 g/cm$^3$.

Table 8 recaps some slurries designs and rheological properties. Expansion tests results are displayed table 9.

TABLE 8

| Formulations: | A27 | A32 | A34 |
|---|---|---|---|
| Density ppg | 15.85 | 13.31 | 15.8 |
| Porosity % | 42 | 42 | 47.7 |
| Cement (% BVOB) | 40 | 40 | |
| Fine silica (% BVOB) | 10 | 10 | |
| Polynorbornene (% BVOB) | 20 | 50 | 9 |
| Silica sand (% BVOB) | 30 | | |
| Polypropylene glycol (antifoam) (gpsb) | 0.03 | 0.03 | 0.03 |
| Polynaphtalene sulfonate (dispersant (gpsb) | 0.03 | 0.05 | 0.03 |
| Rheology after mixing | | | |
| PV (cP) | 180 | 194 | 220 |
| Ty (lbf/100 ft$^2$) | 21 | 18 | 45 |
| Rheology after conditioning at 60° C. | | | |
| PV (cP) | 146 | 136 | 210 |
| Ty (lbf/100 ft$^2$) | 28 | 13 | 71 |
| API free water (mL) | 0 | 1.5 | 0 |
| Sedimentation (delta bottom/top in ppg) | 0 | −0.57 | |

TABLE 9

| | Linear expansion (%) | | | | |
|---|---|---|---|---|---|
| | At room temperature | | | At 60° C. | |
| | O1 | O2 | O3 | O1 | O3 |
| A27 | 0.12 | 0.18 | 0.19 | 0.17 | 0.6 |
| A32 | 0.5 | 0.36 | 1 | 2.2 | 1.9 |
| A34 | | | <0.1 | | 0.4 |

Figure 6:
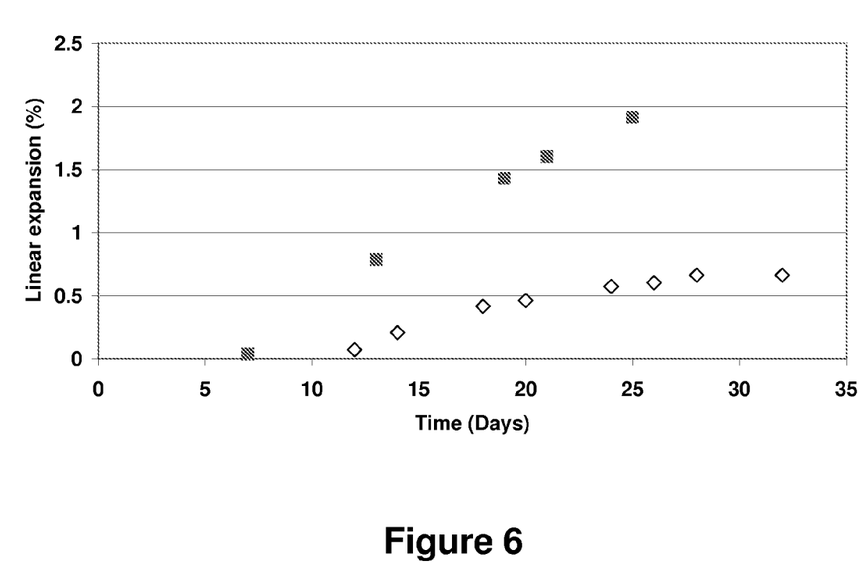

Some expansion is observed with oil O3 at 60° C., as illustrated FIG. 6 where the full squares correspond to the tests performed on cements A32 and the open triangles to the tests performed with cement A27, clearly showing that the higher the concentration of added particles, the higher the expansion.

Figure 7:
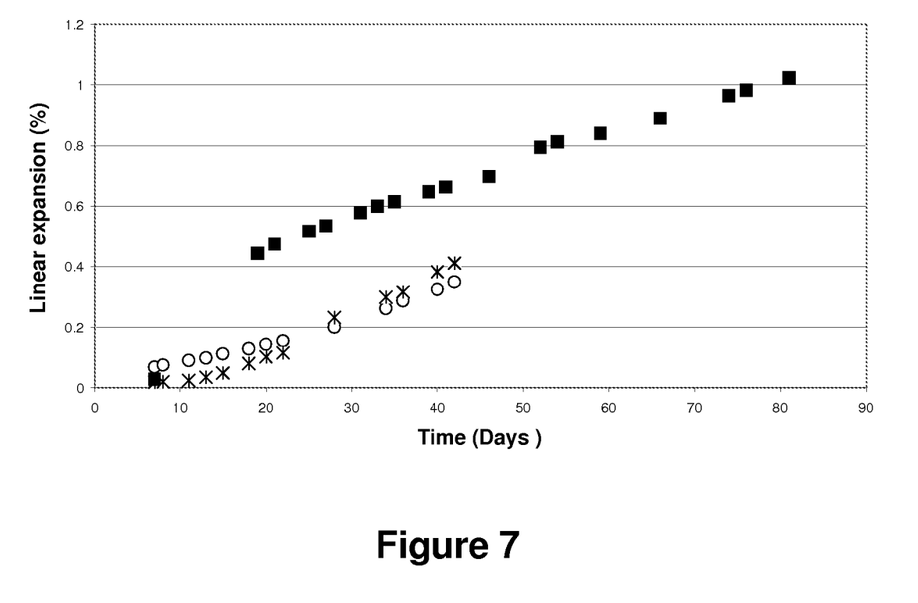

Tests carried out with cement A32 were repeated with the 3 oils. FIG. 7 shows the results with oil O1 (stars), O2 (open circles) and O3 (full squares). Equivalent results are obtained with O1 and O2 oils while higher levels are obtained with O3.

EXAMPLE 5

Acrylic Copolymers

For this series of tests, dry acrylic copolymers, commercialized under the name Pliolite® and available from Eliokem, Villejust, France have been tested. These resins are typically used for exterior masonry paints, concrete and metal protection and coatings.

These resins produce soft colloidal microgels in organic fluids and should be slowly added to the fluid under shear to ensure complete gel development. Two of the tested grades provided acceptable level of expansion. These two grades correspond to pre-reticulated substituted styrene acrylate copolymer; having a density of 1.03 g/cm$^3$, and commercialized under the name Pliolite DF02 (CAS number 68240-06-2; resin R1) and Pliolite DF04 (CAS number 172201-26-2; resin R2).

Test compositions are provided Table 10. Note that the resins are prehydrated in water during 5 minutes at 4000 rpm. Rheological properties could not be measured due to unstable readings. Expansion levels are reported table 11

TABLE 10

| Formulations: | A23 | A24 |
|---|---|---|
| Resin | R1 | R2 |
| Density ppg | 13.6 | 13.6 |
| Porosity % | 42 | 42 |
| Cement (% BVOB) | 40 | 40 |
| Fine silica (% BVOB) | 10 | 10 |
| Resin (% BVOB) | 50 | 50 |
| Polypropylene glycol (antifoam) (gpsb) | 0.03 | 0.03 |
| Polynaphtalene sulfonate (dispersant (gpsb) | 0.04 | 0.05 |

TABLE 11

| | Linear expansion (%) | | | | |
|---|---|---|---|---|---|
| | At room temperature | | | At 60° C. | |
| | O1 | O2 | O3 | O1 | O3 |
| A27 | <0.1 | | | 0.12 | |
| A32 | 0.12 | 0.1 | | 0.39 | 0.5 |

Figure 8:
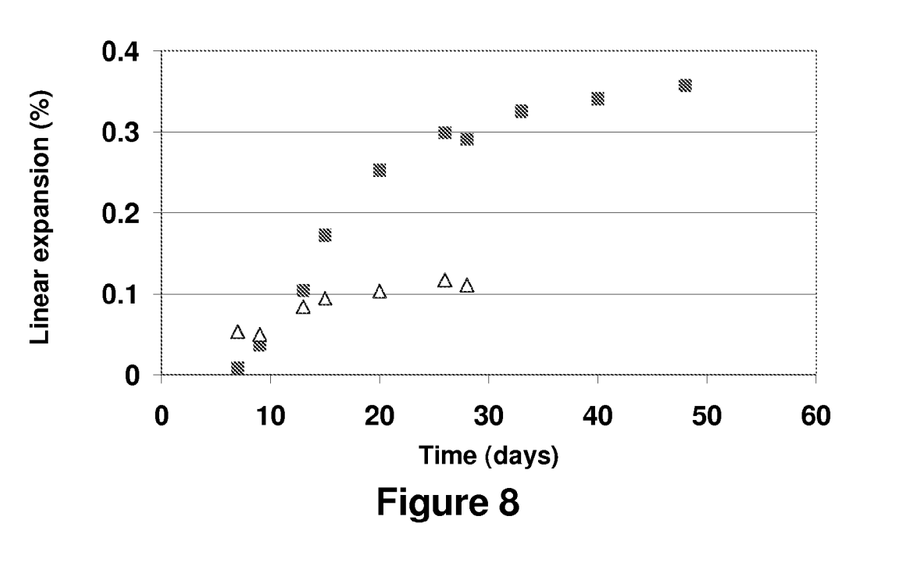

As shown table 11 above, fair expansion levels can be obtained with this type of resins. FIG. 8 shows the development of the expansion level along time for test A24 in oil O3—with the full-square marks corresponding to the tests at 60° C. and the open-triangle marks for the tests at room temperature.

EXAMPLE 6

Elastomeric Terpolymers

In the preceding examples, the expansion was enhanced by an elevation of the temperature. This is however not a definitive rule as it will be illustrated with the following test, performed with Nordel® MG, an elastomeric terpolymer from ethylene, propylene and a non-conjugated diene (EPDM), available from Dupon Dow Elastomer, Wilmington, Del., USA.

The composition of slurry A28 is shown table 12, expansion levels table 13.

TABLE 12

| Formulation: | A28 |
|---|---|
| Density ppg | 15.87 |
| Porosity % | 42 |
| Cement (% BVOB) | 40 |
| Fine silica (% BVOB) | 10 |
| EPDM (% BVOB) | 20 |
| Silica sand (% BVOB) | 30 |
| Polypropylene glycol (antifoam) (gpsb) | 0.03 |
| Polynaphtalene sulfonate (dispersant (gpsb) | 0.03 |

TABLE 13

| | Linear expansion (%) | | | | |
|---|---|---|---|---|---|
| | At room temperature | | | At 60° C. | |
| | O1 | O2 | O3 | O1 | O3 |
| A28 | 0.85 | >1.2* | 0.7-1.7 | | <0.1 |

*cracks

The tested formulation A28 shows expansion in contact with oil O3 at room temperature, contrary to other tested products, the expansion level is decreased by temperature since it is below 0.1% at 60° C. and reached between 0.6% and 1.6% with large dispersion in measurement at room temperature.

The invention claimed is:

1. A method of repairing a faulty set cement composition in a subterranean well, comprising:
   (i) preparing a cement composition comprising water, cement and a powder material that reacts and/or expands in contact with liquid or gaseous hydrocarbon;
   (ii) placing the cement composition in the well;
   (iii) allowing the cement composition to set; and
   (iv) pumping a liquid or gaseous hydrocarbon in the immediate vicinity of the set cement composition.

2. The method of claim 1, wherein the powder material is selected from the group consisting of rubber, poly-2-2-1 bicycloheptene (polynorbornene), alklystyrene, crosslinked substituted vinyl acrylate copolymers, diatomaceous earth and mixtures thereof.

3. The method of claim 1, wherein the powder material has a granular dimension of less than 850 μm.

4. The method of claim 1, wherein the powder material has a density in the range 0.8 to 2.7 g/cm$^3$.

5. The method of claim 1, wherein the powder material is present at a concentration of from 10 to 50% by volume of blend.

6. The method of claim 1 further comprising an additive having residual water-absorption properties after the setting of the cement, thereby susceptible to swell in contact with underground water.

* * * * *